United States Patent [19]

Fetterolf et al.

[11] Patent Number: 5,051,944
[45] Date of Patent: Sep. 24, 1991

[54] COMPUTER ADDRESS ANALYZER HAVING A COUNTER AND MEMORY LOCATIONS EACH STORING COUNT VALUE INDICATING OCCURRENCE OF CORRESPONDING MEMORY ADDRESS

[75] Inventors: David T. Fetterolf; John R. Kim; Clifford A. Lindroth, Jr., all of San Diego, Calif.

[73] Assignee: NCR Corporation, Dayton, Ohio

[21] Appl. No.: 853,259

[22] Filed: Apr. 17, 1986

[51] Int. Cl.$^5$ .............................................. G06F 11/34
[52] U.S. Cl. .................................... 364/900; 364/920; 364/944.9; 364/944.92
[58] Field of Search ... 364/200 MS File, 900 MS File; 324/73 AT; 371/16

[56] References Cited

U.S. PATENT DOCUMENTS

| | | | |
|---|---|---|---|
| 3,588,837 | 6/1971 | Rash | 364/200 |
| 4,195,258 | 3/1980 | Yen | 324/73 AT |
| 4,213,178 | 7/1980 | Diez et al. | 364/200 |
| 4,475,195 | 10/1984 | Carey | 371/16 |
| 4,752,928 | 6/1988 | Chapman et al. | 371/16 |

Primary Examiner—Thomas C. Lee
Attorney, Agent, or Firm—Wilbert Hawk, Jr.; Gregory P. Gadson; Edward Dugas

[57] ABSTRACT

A computer monitoring device for recording the number of times address locations of a computer are accessed by a test program in order to determine if each available address is addressed by the test program and the frequency of the accesses. Omissions or low numbers of accesses reveal weak portions of the test program. The device is comprised of a probe for coupling to the address bus of the computer under test, a monitor computer and an address analyzer coupled to the probe and the monitor computer. The analyzer is comprised of a memory having at least one addressable location for every valid address that appears on the address bus. For each address received a fetch of a count stored at the location represented by that memory address is performed and the count is incremented by one and stored back into the memory at the accessed location.

12 Claims, 20 Drawing Sheets

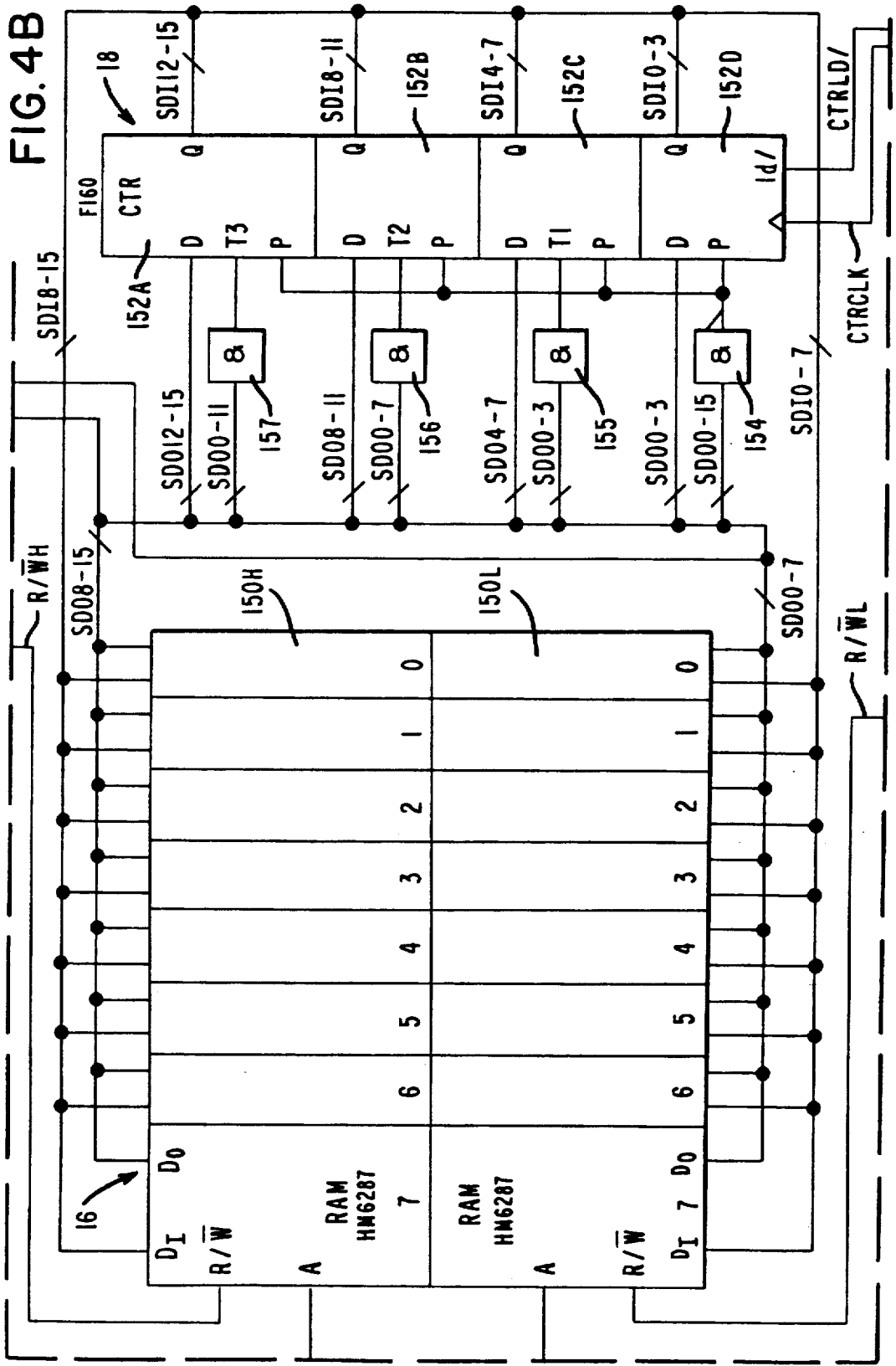

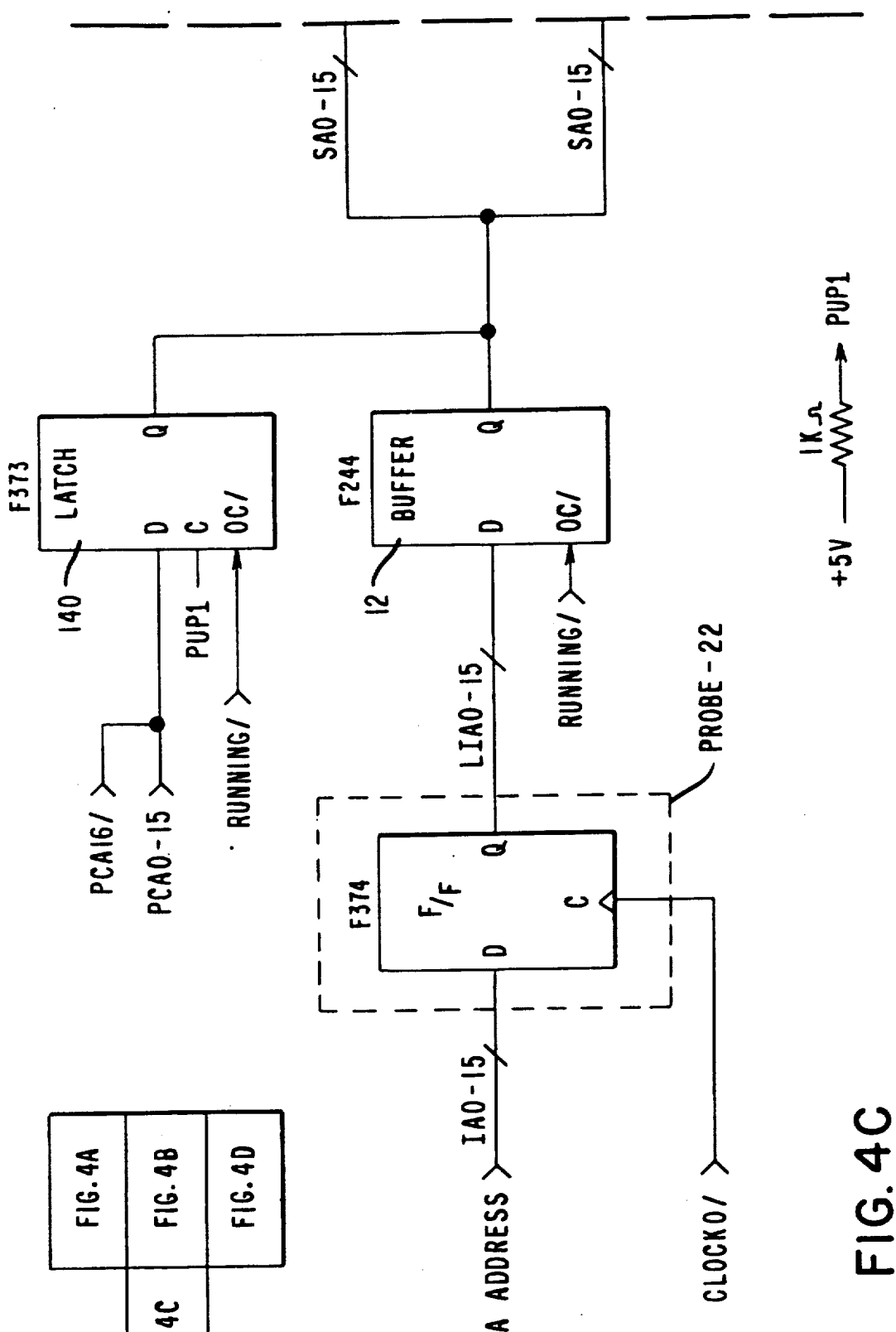

COMPUTER ADDRESS ANALYZER HAVING A COUNTER AND MEMORY LOCATIONS EACH STORING COUNT VALUE INDICATING OCCURRENCE OF CORRESPONDING MEMORY ADDRESS

BACKGROUND OF THE INVENTION

This invention relates to computer monitoring devices and more specifically to a diagnostic device for determining the thoroughness of software and firmware tests. To determine if a computer is operating up to expectations, one or more software test programs are run on the machine and the results are compared against standard results. Any deviations would indicate a malfunction in the machine under test. The problem associated with such testing is that the software test programs may not be testing one or more features of the machine and if such is the case, a malfunction in the untested feature would go undetected and uncorrected. A non-test program which uses the defective feature would, of course, cause an error to appear in the computer's output. It is, therefore, desirable to have the means whereby a quantitative measurement can be made of the scope of coverage of the test program so that gaps in the testing can be filled.

A patent of interest for its teaching of monitoring the operation of a computer for the purpose of detecting sources of malfunctions is U.S. Pat. No. 3,771,131, entitled, "Operating Condition Monitoring in Digital Computers", by A. T. Ling. In this patent, there are provided hard-wired connections to test points located within the computer under test. A switching arrangement selects a particular plurality of these test points, as a set, and during preselected operational phases, the signals developed at the selected test points are entered into a register. This operation has been called a "snapshot". The signal pattern developed at a particular snapshot is then compared against known snapshots with any difference indicating a malfunction. Snapshots may be compared by visually displaying the snapshot on a CRT and having an operator with an appropriate chart, or the like, noting any differences. Alternatively, there is suggested comparing the snapshots stored in the register with known snapshots stored in corresponding preprogrammed registers such that a difference would cause a warning indicator to be activated. Devices similar to the one disclosed in the referenced patent are effective in determining malfunctions, but it is first assumed that the device checks all potentially defective circuits, which may, in fact, not be the case. The present invention is directed to a computer address analyzer which determines the quality of testing by indicating which portions of a computer system have not received adequate testing.

SUMMARY OF THE INVENTION

In the preferred embodiment of the invention, there is provided a bus probe for coupling the address bus of the computer under test to the computer address analyzer, a monitor computer, and a bus for coupling the monitor computer to the computer address analyzer. The address analyzer is comprised of a memory having at least one addressable memory location for every valid address that appears on the address bus of the computer under test, interfacing means for interfacing the computer under test and the monitor computer to the memory, control means for controlling the operation of the interfacing means and the memory such that each address of the computer under test is used to fetch a location in the address analyzer memory, and a counter for counting the number of times an address is accessed and for providing storage in memory for storing that count.

In operation, prior to commencing a test, all of the memory elements in the computer address analyzer are cleared to zero. The test is then commenced and upon the first fetching action the value stored in the addressed memory location is checked to determine if it is all 1's indicating a maximum count and, if not, the value is incremented by 1 and stored back into the addressed memory location. This process continues until all testing programs, running on the computer under test, are completed. Analysis of the count contained in each of the memories' locations determines the completeness of the testing performed by the test software. For example, a 0 count would indicate that the location was not accessed while a count of 64K-1 would indicate a maximum number of accesses.

From the foregoing it can be seen that it is a primary object of the present invention to provide an analyzer for determining the thoroughness of a computer test program.

It is another object of the present invention to provide an analyzer which is transparent to the computer under test.

It is a further object of the present invention to provide an analyzer which is readily usable with a monitor computer for providing quantitative measurements of the quality of a computer test program.

These and other objects of the present invention will become more apparent when taken in conjunction with the following description and drawings, wherein like characters indicate like parts and which drawings form a part of the present specification.

BRIEF DESCRIPTION OF THE DRAWINGS

FIG. 4 is a map illustrating the assembly orientation of FIGS. 4A, 4B, 4C and 4D.

FIGS. 4A, 4B, 4C and 4D illustrate in a more detailed electronic logic block diagram form the major subsystems shown in FIG. 3.

DESCRIPTION OF THE PREFERRED EMBODIMENT

Figure 1:
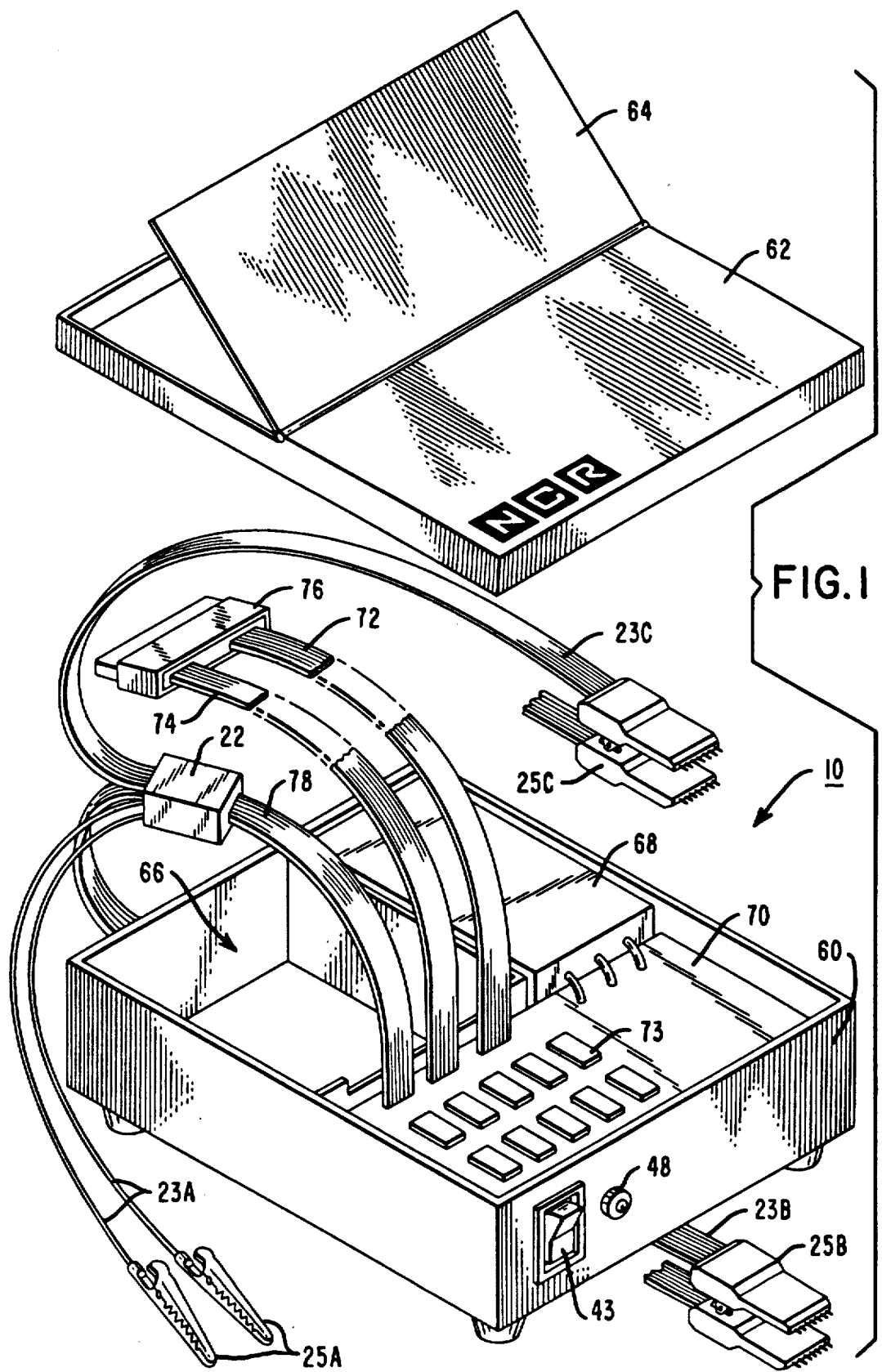
FIG. 1 is a perspective view of the preferred embodiment of the invention showing the cabinet, cabling, and some associated electronic hardware.

Referring to FIG. 1, the address analyzer 10 is self-contained within a rectangular cabinet 60 having a top 62 with a hinged portion 64. A wire-wrap circuit board 70 with appropriate integrated circuit chips 73 provide the basic analyzer electronics. A power supply 68 provides power to the circuit board 70. Switch 43 controls the operating mode of the analyzer and light 48 provides a visual indication of such operation. A probe 22 is connected to the circuit board 70 via a cable 78 at one end and is connectable to a computer under test by means of clips 25A-25C and conductors 23A-23C. Clips 25A are connectable, one each, to the system clock of the computer under test and to ground. Clips 25B and 25C are connectable to the address bus of the computer under test. A connector 76 is adapted to mate with a connector one a monitor computer such as an NCR PC-4. Connector 76 is connected by means of cables 72 and 74 to the circuit board 70. A compartment 66 is provided in the cabinet 60 for storing all of the cables, connectors and probe, when not in use. The cover 62 is fixedly attached to the cabinet 60 over that portion which houses the circuit board 70, with the hinged portion 64 designed to be closed when the cables are stored in the compartment 66.

Figure 2:
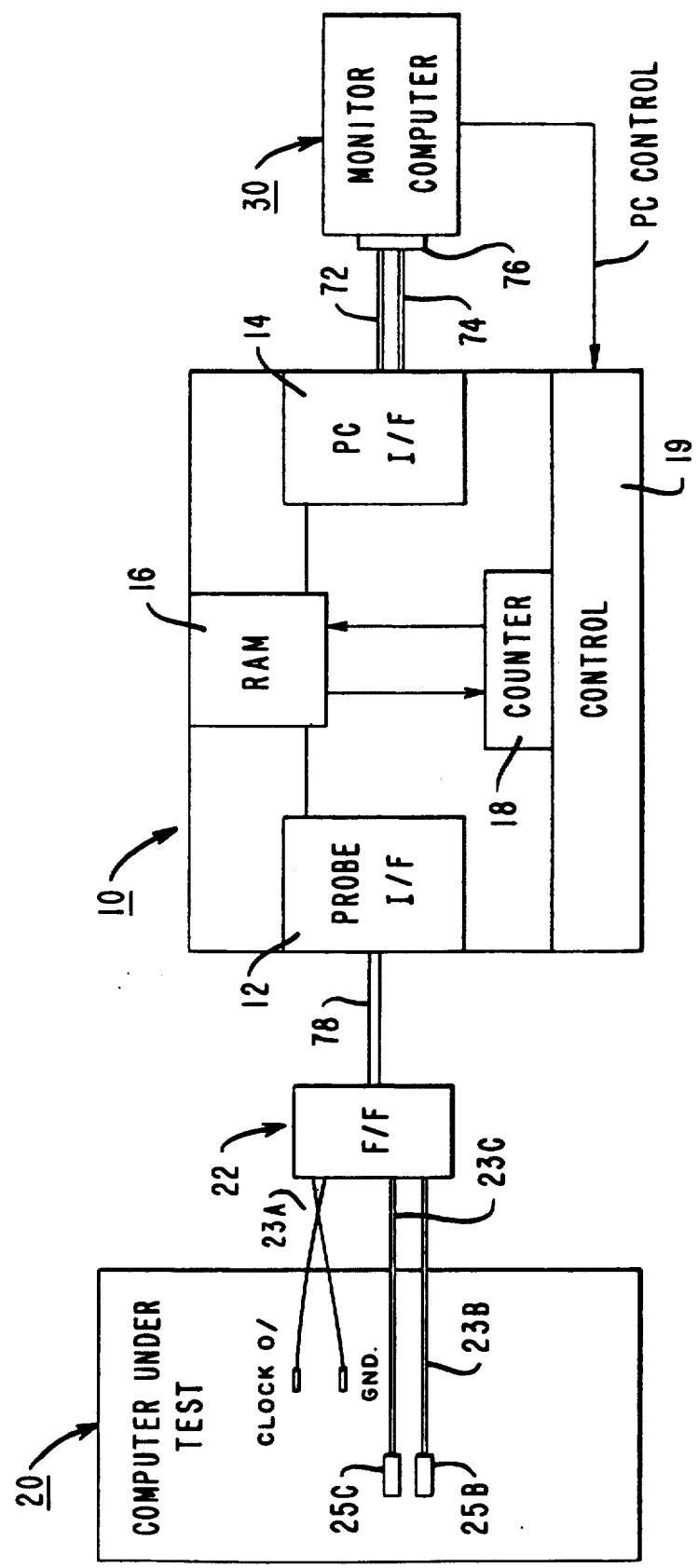
FIG. 2 is a simplified electronic block diagram of the preferred embodiment of the invention.

Referring now to FIG. 2, the address analyzer 10 is connected to a computer under test 20 by means of the probe 22, clips 25A-25C and associated conductors 23A-23C. A monitor computer 30 is connected to the address analyzer 10 by means of connector 76 and cables 72 and 74. Within the analyzer 10 there is a RAM 16 that is adapted to receive addressing data from the computer under test via the probe 22 and a probe interfacing module 12. A monitor computer interface module 14 is connected to the RAM 16 and to the monitor computer 30 via the cables 72 and 74. A counter circuit 18 is coupled to the RAM 16 for the purpose of incrementing the count read from the addressed memory element and for redirecting the incremented count back to memory. A control and timing unit 19 in response to a group of signals, labeled PC CONTROL, from the monitor computer 30 directs traffic from the two interfacing modules 12 and 14 and controls the counter circuit 18.

To describe a simplistic level of operation, the address analyzer 10 has its RAM 16 cleared to all 0's and its addresses set to correspond to each possible address in the computer under test 20. Test programs are then run on the computer under test 20. As the test programs run, each address appearing on the address bus, of the computer under test, is directed to the probe interfacing module and a corresponding memory address is accessed in RAM 16. The count stored in the accessed memory is initially 0, but it is still compared against an all 1 content, (maximum count). If the addressed count is not all 1's, then the count in counter 18 is incremented by 1 and restored back into RAM 16. This process continues during the entire testing of the computer 20 with the RAM recording the bit counts up until each word of the memory contains all 1's, or until the tests are over, whichever comes first. For a particular address any additional bits past the maximum amount of 64K-1 will cause no further change in the memory. The monitor computer 30 is then used to readout the data stored in the RAM 16 via the PC interface module 14 and the bus cables 74 and 72. The monitor computer can perform various types of analysis on the stored data, but generally speaking, the most important information is derived from the fact that one or more of the memory addresses may not have been accessed by the running of the diagnostic software program and which omission would indicate that a portion of the CPU was not exercised to determine if it was operating properly. Additionally, it may be determined that a limited number of bits appeared at one or more addresses which would indicate, possibly, that additional testing should be directed to those addresses. The test program could then be modified to fill any blank spots and/or bolster weak spots so that a more thorough test could be achieved.

Figure 3:
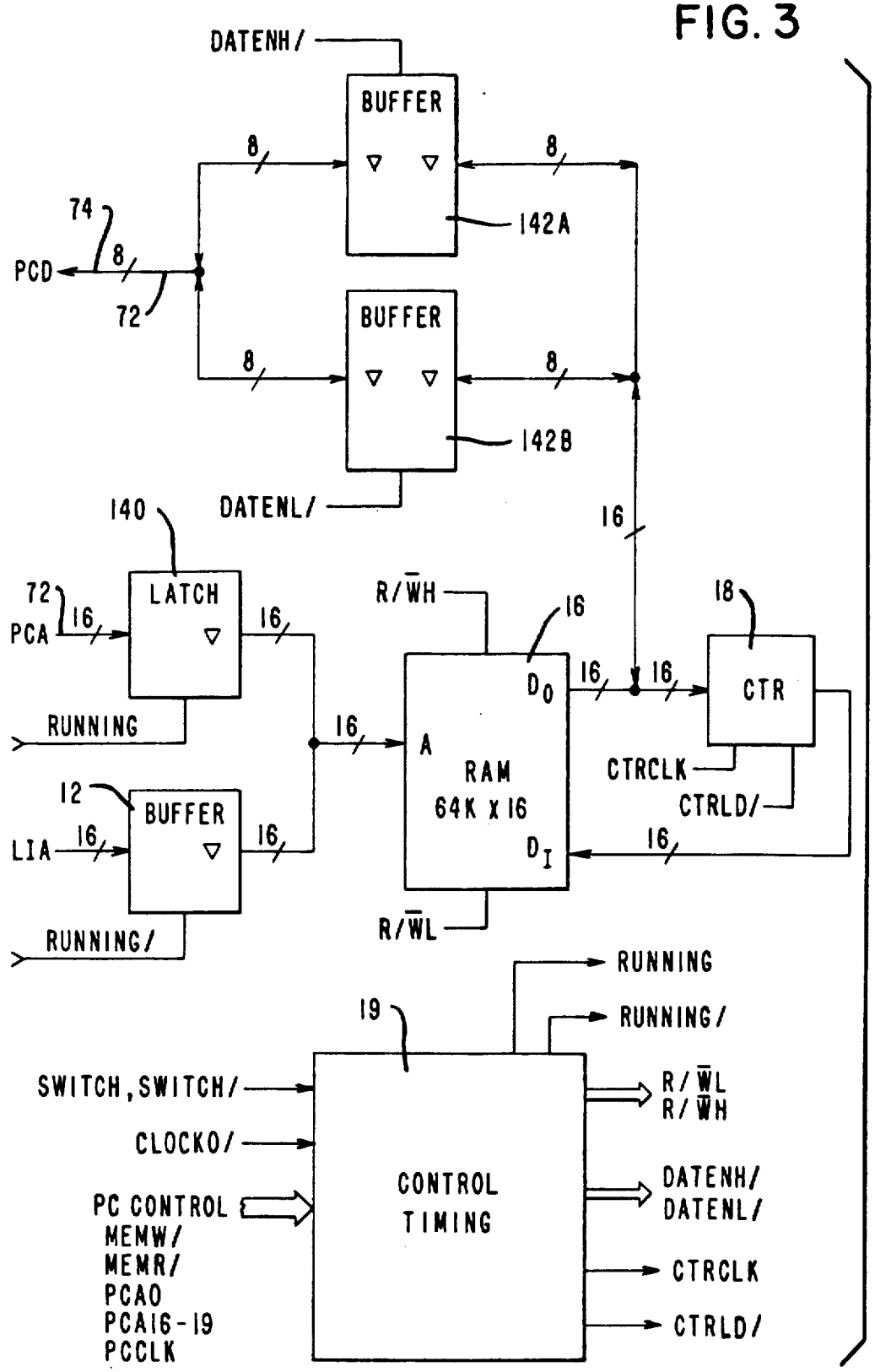
FIG. 3 is a more detailed electronic block diagram of the preferred embodiment of the invention illustrating major subsystems.

Referring now to FIG. 3, the monitor computer interface module 14 is comprised of a latch circuit 140 controlled by the signal RUNNING for receiving a sixteen bit input from the monitor computer 30 over 16 conductors of the bus cable 72 and a pair of bidirectional buffers 142A and 142B controlled by the signals DATAEN H/ and DATAEN L/, respectively, for bidirectionally receiving and transmitting data to the monitor computer 30 and to the RAM 16 over eight conductors of the bus cable 74. The sixteen bit output, from the latch 140, is directed in parallel to the address inputs A of the 64K × 16 RAM 16. The eight bit input/output of the bidirectional buffers 142A and 142B is coupled to the data outputs $D_O$ of the RAM 16. The signals R/W/H and R/W/L control the high and the low bank of the RAM 16 in a manner to be discussed. The counter 18 receives the addressed count from the RAM output $D_O$ and increments that count under control of the signals CTRCLK and CTRLD/ with the incremented count directed as inputs to the data inputs $D_I$ of the RAM 16. The probe interfacing module 12 is comprised of two eight bit buffers 120A and 120B shown in detail in FIGS. 6A and 6B. The probe interfacing module 12 outputs sixteen address bits to the RAM 16 under control of a RUNNING/ signal received from the control and timing unit 19. The control and timing unit 19 also provides the control signals R/W/L, R/W/H, DATENH/, DATENL/, CTRCLK, CTRLD/. The control and timing unit 19 is activated by SWITCH and SWITCH/ signals and also receives as inputs the signals, CLOCK0/, and as PC CONTROL signals the signals, MEMW/, MEMR/, the monitor address bits PCA 0, PCA 16-19 and the monitor clock signal PCCLK. Where and how these signals are used in the present embodiment will be later shown and explained in the specification.

Figure 4A:
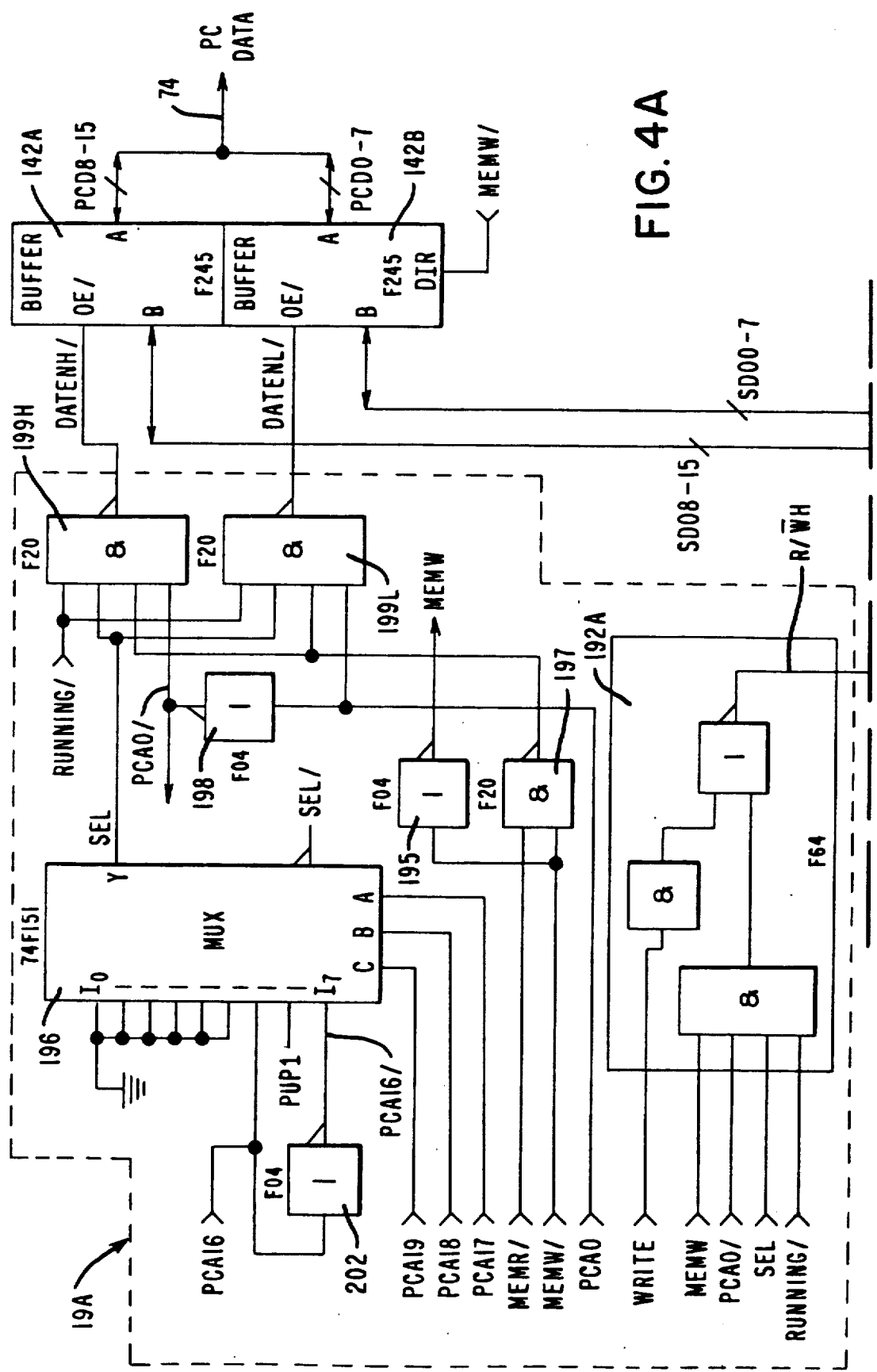
Figure 4D:
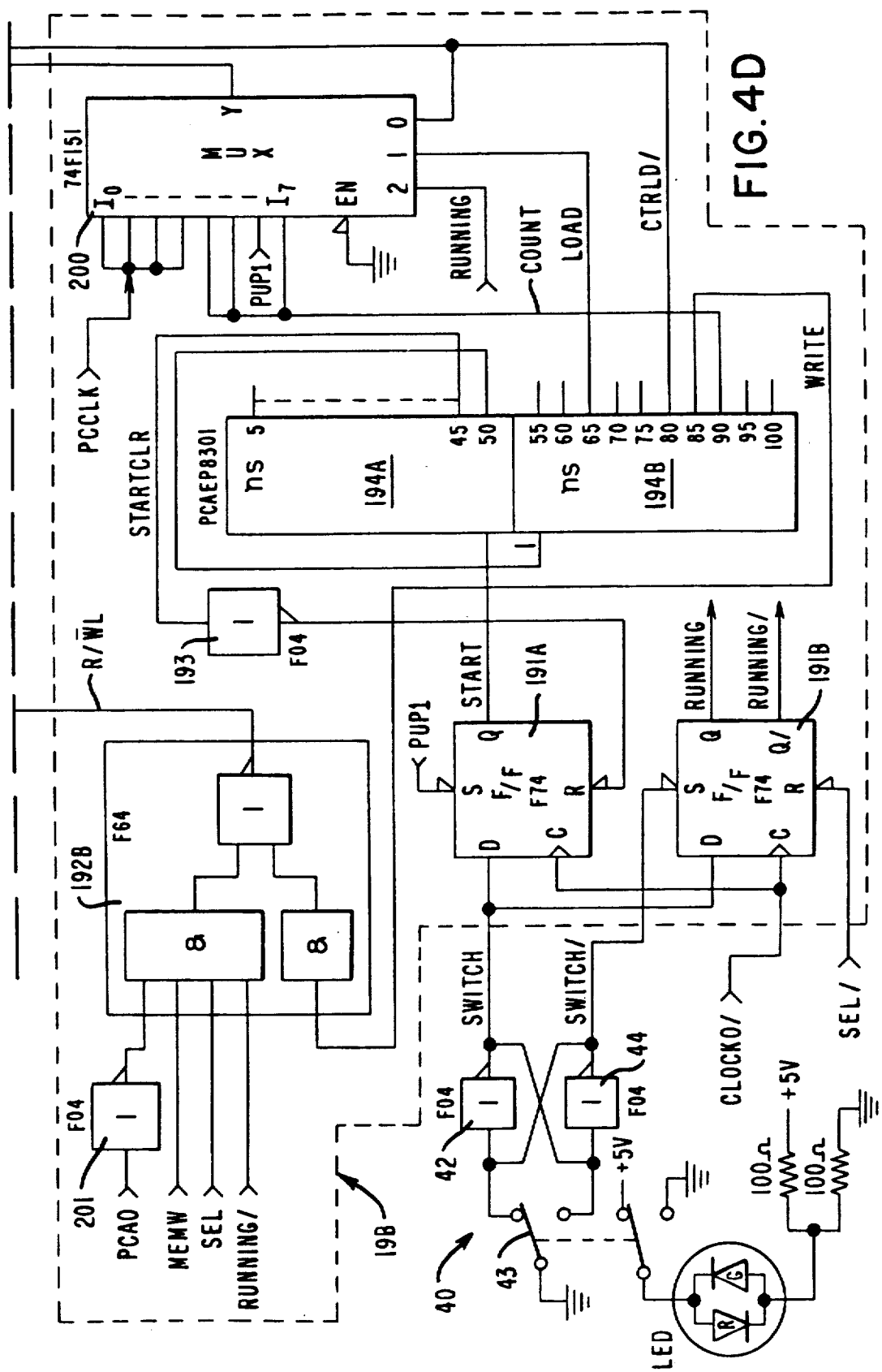

Referring now to FIGS. 4A, 4B, 4C and 4D assembled in accordance with the map of FIG. 4, a stop/start switch 40 is comprised of a pair of cross-coupled inverters 42 and 44 alternately connectable to ground via a DPDT switch 43. The second pole of switch 43 is connected to a pair of light emitting diodes, one green and one red. The light emitting diodes are connected to ground and to a +5 volt source by 100 ohm resistors. The second pole of switch 43 is connectable to either a +5 volt source contact or to a ground contact. When the second pole is connected to the +5 volt source contact the red diode is lit and when the second pole is connected to the ground contact the green diode is lit. The output signal from inverter 42 is denoted the SWITCH signal and the output signal from the inverter 44 is denoted the SWITCH/ signal. The control and timing circuit 19 is shown in FIGS. 4A and 4D as two separate units, 19A and 19B, outlined with dashed lines. The SWITCH signal is coupled to the D inputs of a pair of D-type flip-flops 191A and 191B located within the control and timing unit 19B. Each flip-flop is connected to receive on its clocking input the clocking signal CLOCK0/ which signal is the system clock signal from the computer under test. The Q and Q/ outputs of flip-flop 191B provide the control signals RUNNING and RUNNING/, respectively. A SEL/ signal, generated by a multiplexer 196 (FIG. 4A) is applied to the reset input R of flip-flop 191B. The reset input of flip-flop 191A receives a signal STARTCLR/ via an inverter 193. The signal on the Q output of flip-flop 191A is the START signal which signal is directed to a pair of serially connected active delay elements 194A and 194B. The START signal passes through the delay elements and is tapped off, as the signal STARTCLR, at the 45nsec tap, as the signal LOAD, at the 65nsec tap, as the signal CTRLD/, at the 80nsec tap, as the signal WRITE at the 85nsec tap, and as the signal COUNT, at the 90nsec tap.

Two identical logic circuits 192A and 192B are used to select a high and a low portion 150H and 150L, respectively, of the RAM 16. The input signals to the two logic circuits are identical except for the signal PCA0 which on the 192A logic circuit is active in the non-inverted state and on the circuit 192B it is active in the inverted state in that the signal PCAO is inverted by an inverter 201. The RAM 16 is arranged into a high bank 150H and a low bank 150L of eight HM6287 RAM chips labeled 0 through 7. The enabling signal R/W/H from logic circuit 192A is directed to the R/W/ inputs of the high bank of RAM chips. The enabling signal R/W/L from logic circuit 192B is directed to the R/W/ inputs of the low bank of RAM chips.

In operation, when the RAM 16 is being addressed by the addresses from the computer under test, both the high and the low bank of the memory are activated such that the 16 address bits are used to address 16 locations in the memory. When the memory is being read out, by the monitor computer, only ½ of the memory is activated at one time. The reason for this is that the monitor computer can only handle 8 bits of data at a time, such being the case, the 8 high bits of data are fed out first and then the 8 low bits of data follow. This alternate readout continues until all the data is read out of the memory.

The 16 bit buffer 12 operates to receive the 16 address bits LIA0-15 from the computer under test on its D inputs via the probe flip-flops 22 and to buffer the 16 address bits on its Q outputs through to the A inputs of the RAM chips. The latch 140 is comprised of a pair of 8 bit, 74F373 D-type flip-flops (shown in more detail in FIGS. 6A and 6B) which receive on their D inputs the 16 address bits PCA 0-15 from the monitor computer 30. These 16 address bits are latched to the Q outputs, of flip-flop 140, when the RUNNING/ signal is active and are also coupled to corresponding address inputs SA-0-15 to the RAM 16. Data is read into and out of the RAM via the DI and DO labeled connections.

The counter 18 is comprised of four identical stages 152A-152D which receive the data appearing on the SD0 bus at the D labeled inputs. A block of logic gates 154-157 provide the counter 18 with a fast look-ahead carry by driving the counter, through its $T_1$-$T_3$ inputs, to quickly enable or disable each counter stage. The counter functions to compare the 16 data bits, corresponding to the count, read from the RAM and if all of the 16 data bits are not set to 1, the counter increments by 1 and the updated bits are clocked back to the memory via the SDI0-7 and SDI8-15 data buses. If all 16 data bits SDO0-15 are set to 1, the NAND gate 154 does not provide an enabling signal to the P inputs to the counter stages which causes the counter not to increment.

The bidirectional buffers 142A and 142B are comprised of two 74F245 8-bit buffer chips which are shown in detail FIG. 10B. The bidirectional buffers operate to permit signals to pass in either direction or to provide a high impedance, no pass, state. The PCD0-7 and PCD8-15 outputs/inputs are coupled to the monitor computer 30 via the cable 74. In the preferred embodiment of the invention, the monitor computer is an 8-bit machine, therefore, 16-bit words have to be split into two 8 bit groups that are time multiplexed into and out of the buffers 142. If a 16-bit monitor computer is used, such multiplexing is not necessary. The signals which select the buffers are the signals DATENH/ and DATENL/. The DATENH/ and DATENL/ signals are derived from a portion of the circuitry within the control and timing unit 19A comprised of, a multiplexer 196, NAND gate 197, inverter 198 and a pair of NAND gates 199H and 199L. The multiplexer 196 provides the signal SEL/, and its complement SEL/ in response to the address bits PCA 16-19 received from the monitor computer 30. An inverter 202 inverts the address bit PCA16 to provide the signal PCA16/ as a multiplexer 196 input signal. The NAND gate 197 receives as inputs the signals MEMR/ and MEMW/ with the active presence of either signal providing an output enable signal to the inputs of NAND gates 199H and 199L. Additionally, the address bit PCA0 is applied to gate 199L and to gate 199H, after inversion, by inverter 198. The signal RUNNING/ is also applied to the inputs of gates 199H and 199L. From the logic it can be seen that the state of the address bit PCA0 determines whether buffer 142A or 142B is enabled with the presence of the aforementioned signals. An inverter 195 coupled to the MEMW/ input to NAND gate 197 provides the signal MEMW.

Within the control block circuitry 19B a multiplexer 200 functions to activate the counter 18 and to clock the data through the counter at the clock rate of the signal COUNT or alternately at the clock rate of the signal PCCLK. The multiplexer 200 also receives the signals RUNNING, LOAD and CTRLD/ on its selection inputs labeled 0, 1 and 2, respectively. The output signal from the multiplexer 200 is the signal CTRCLK which is taken from the Y labeled output and which is directed to the clocking input of the counter 18. The CTRCLK signal, in the running mode, clocks the counter twice per cycle, as is shown in the timing diagram of FIG. 12. The first rising edge of the CTRCLK signal loads the counter and the second increments it. In the not running mode the counters are continuously loaded by the signal PC CLK. A signal PUP1 is used at various indicated locations in the preferred embodiment of the invention e.g. as an input to the multiplexer 200. The signal PUP1 is a logic level 1 signal of approximately +5V in amplitude, generated by attaching a 1K ohm resistor to a +5V supply (see FIG. 4C).

Figure 5:
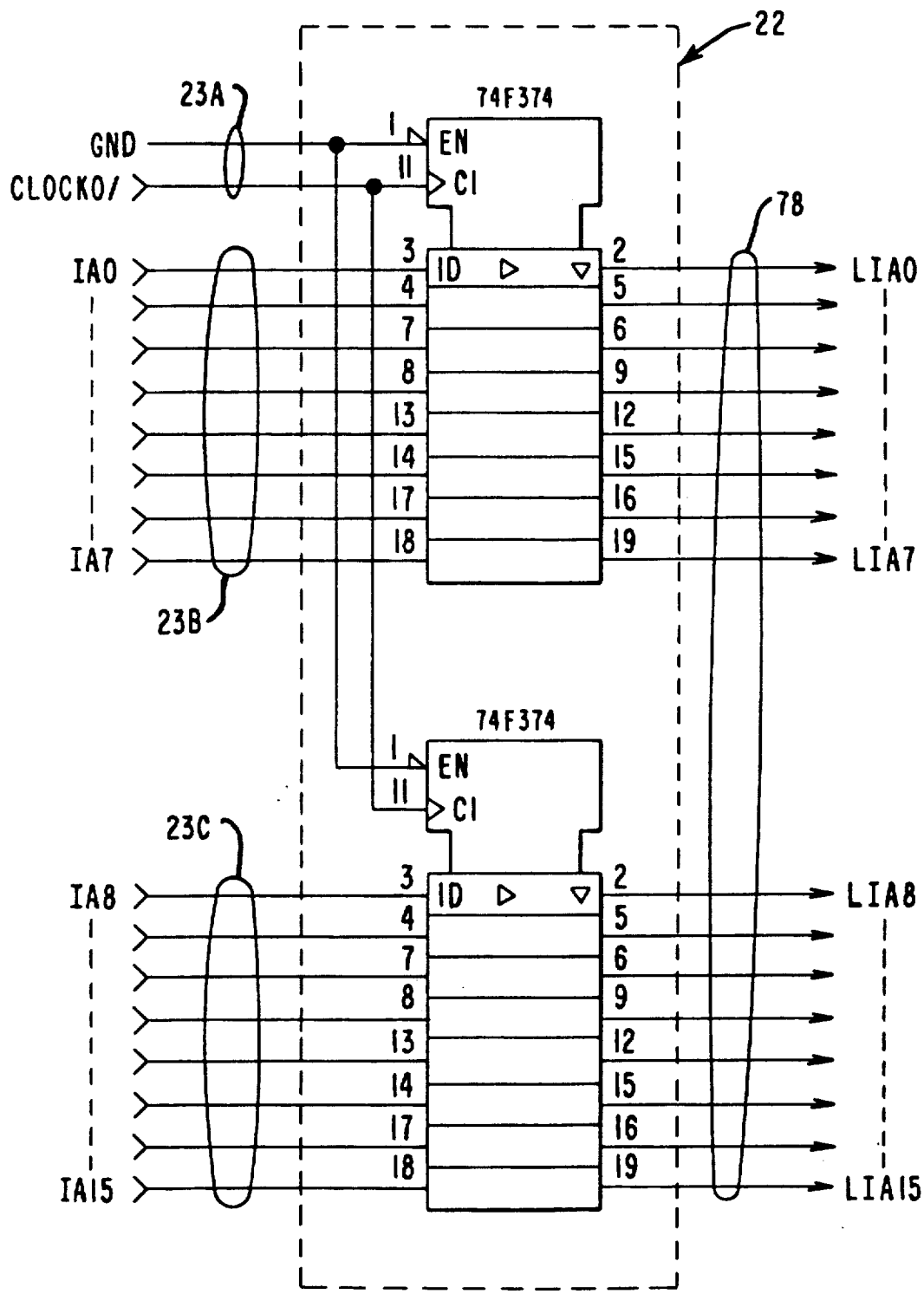
FIG. 5 is an integrated circuit diagram of the probe latch of FIG. 4.

Referring now to FIG. 5, the probe latch 22 is comprised of two 74F374 latches which are continually enabled by strapping their EN terminals to ground. The clock signal CLOCK0/ clocks the signals IA0-15 through to the outputs as corresponding signals LIA0-15. The main function of the probe latch is to minimize the capacitive loading on the address lines of the device under test. The conductors associated with each of the cables 23A-23C, and cable 78, are identified by the associated line loop.

Figure 6A:
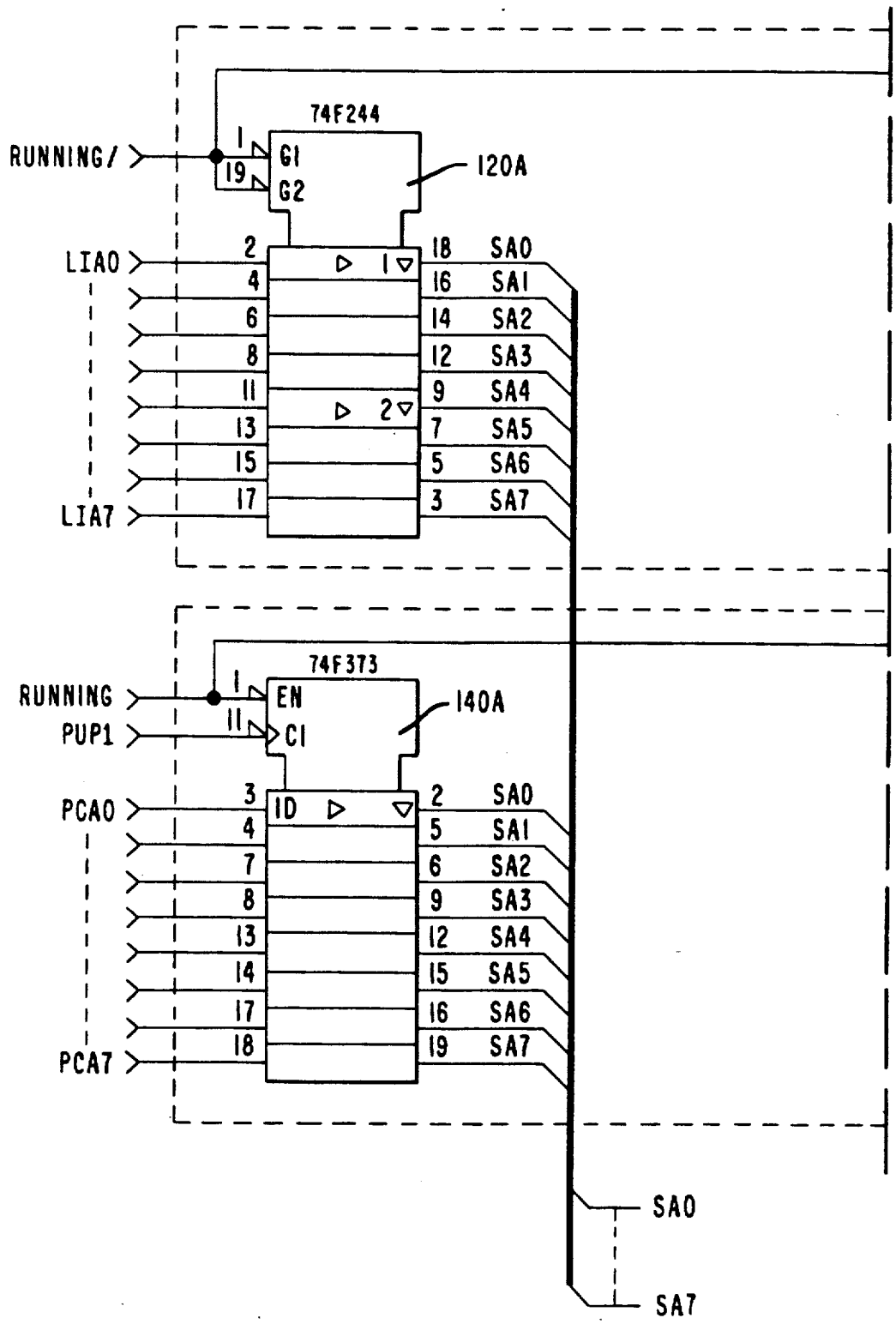
FIGS. 6A and 6B illustrate in integrated circuit diagram form the latches used to couple monitor computer addresses to the RAM of FIG. 4.
Figure 6B:
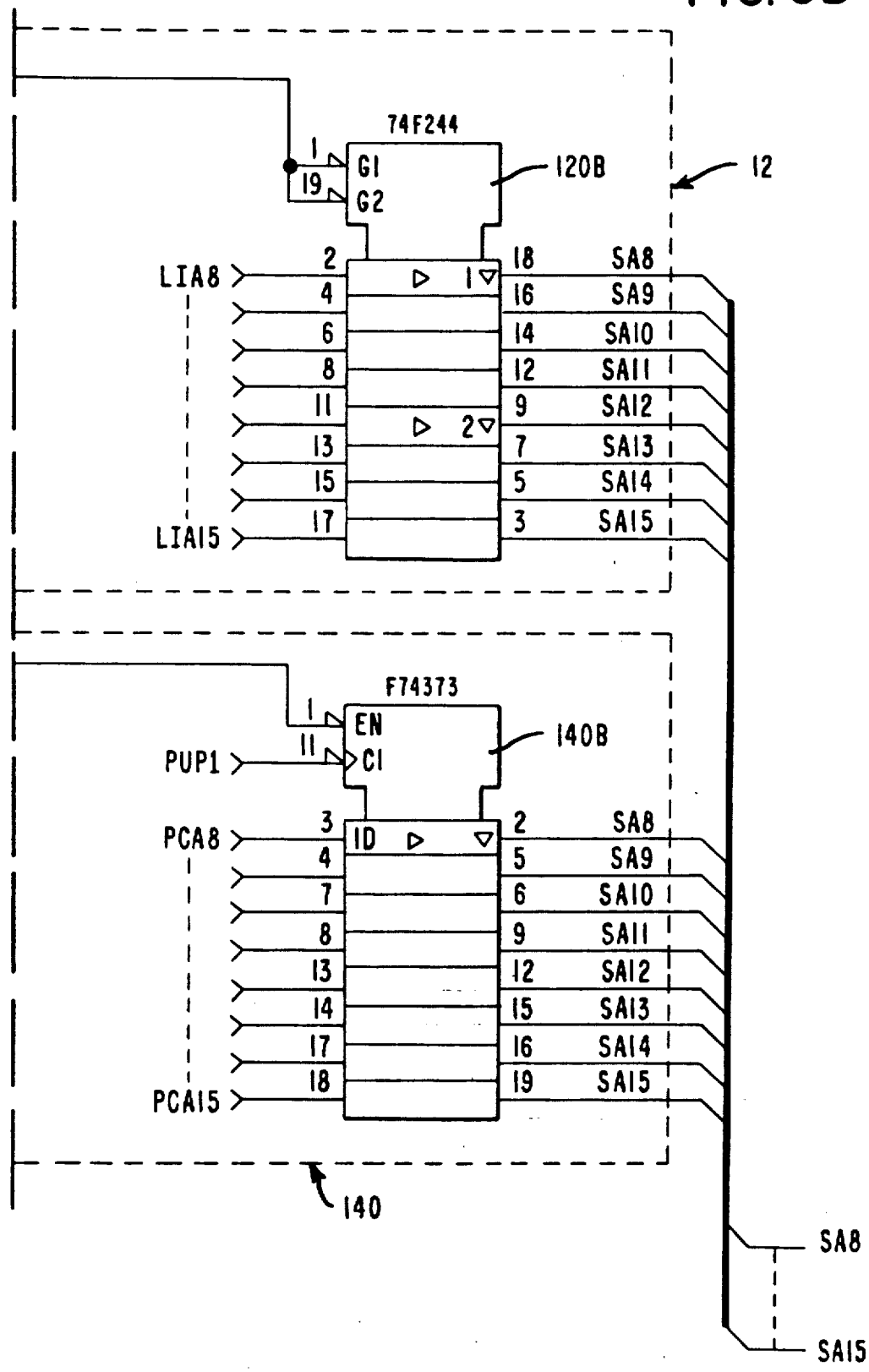

Referring now to FIGS. 6A and 6B, the 16 bit buffer circuit 12 is shown comprised of two 74F244 integrated circuit chips with the chips 120A and 120B connected in the system as shown. The input bits LIA0-15 are applied to the inputs to the 74F244 chips. The corresponding buffered output bits are SA0-SA15. The chips are enabled by the signal RUNNING/.

The latch 140 is comprised of two 74F373 integrated circuit chips 140A and 140B which are enabled with the signal RUNNING. The +5 volt signal PUP1 is applied to the C1 inputs. The monitor computer address bits PCA0-PCA15 are applied as inputs to the latches and appear at corresponding latch outputs as the signals SA0-SA15.

Figure 7:
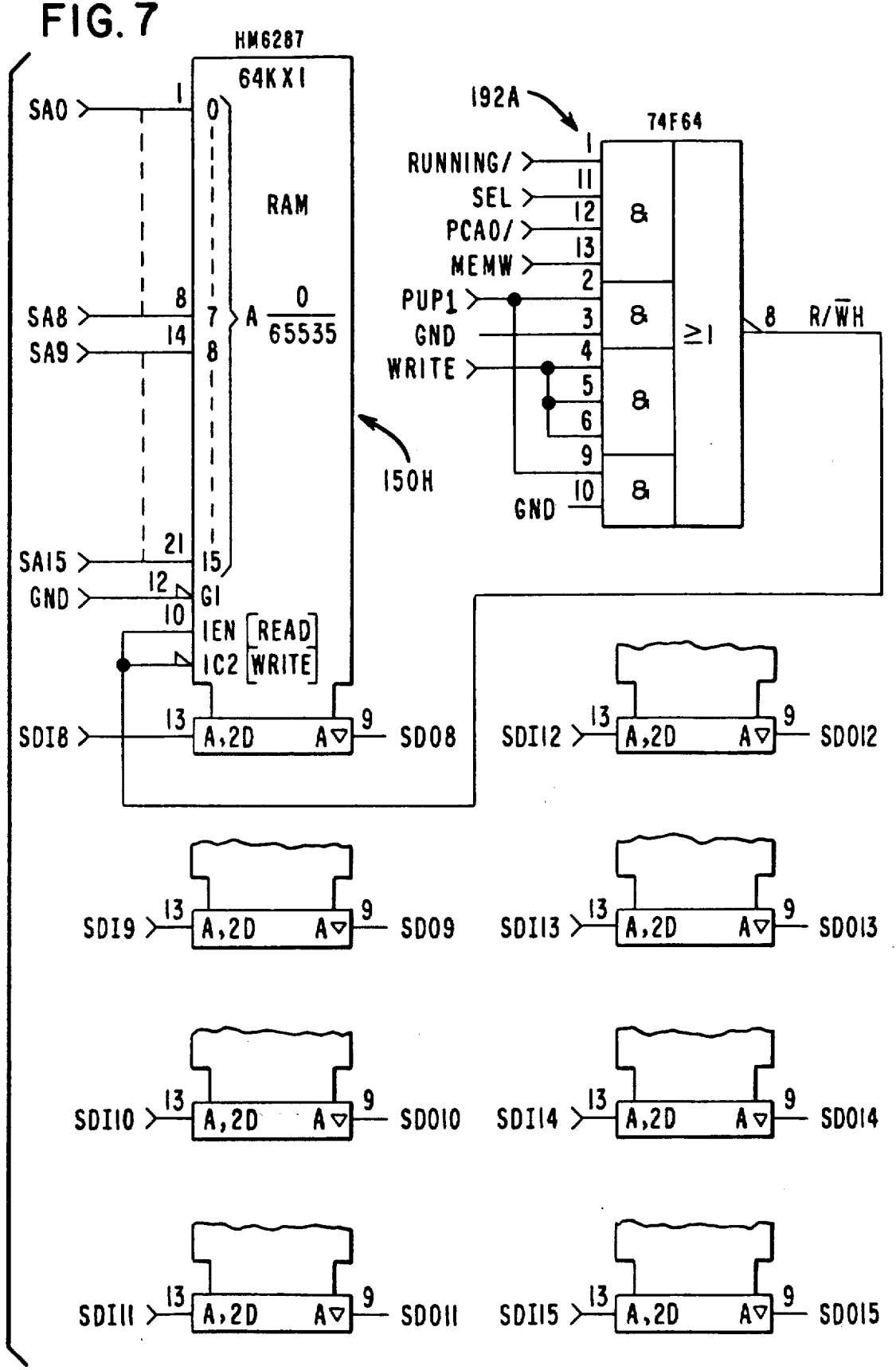
FIG. 7 illustrates in integrated circuit diagram form the high portion of the RAM of FIG. 4.

Referring now to FIG. 7, the high logic circuit 192A is a 74F64 chip. One of the eight HM 6287 high memory RAM chips 150H is shown in full. The remaining seven chips are shown only by their control portions so as to identify their inputs and outputs.

Figure 8:
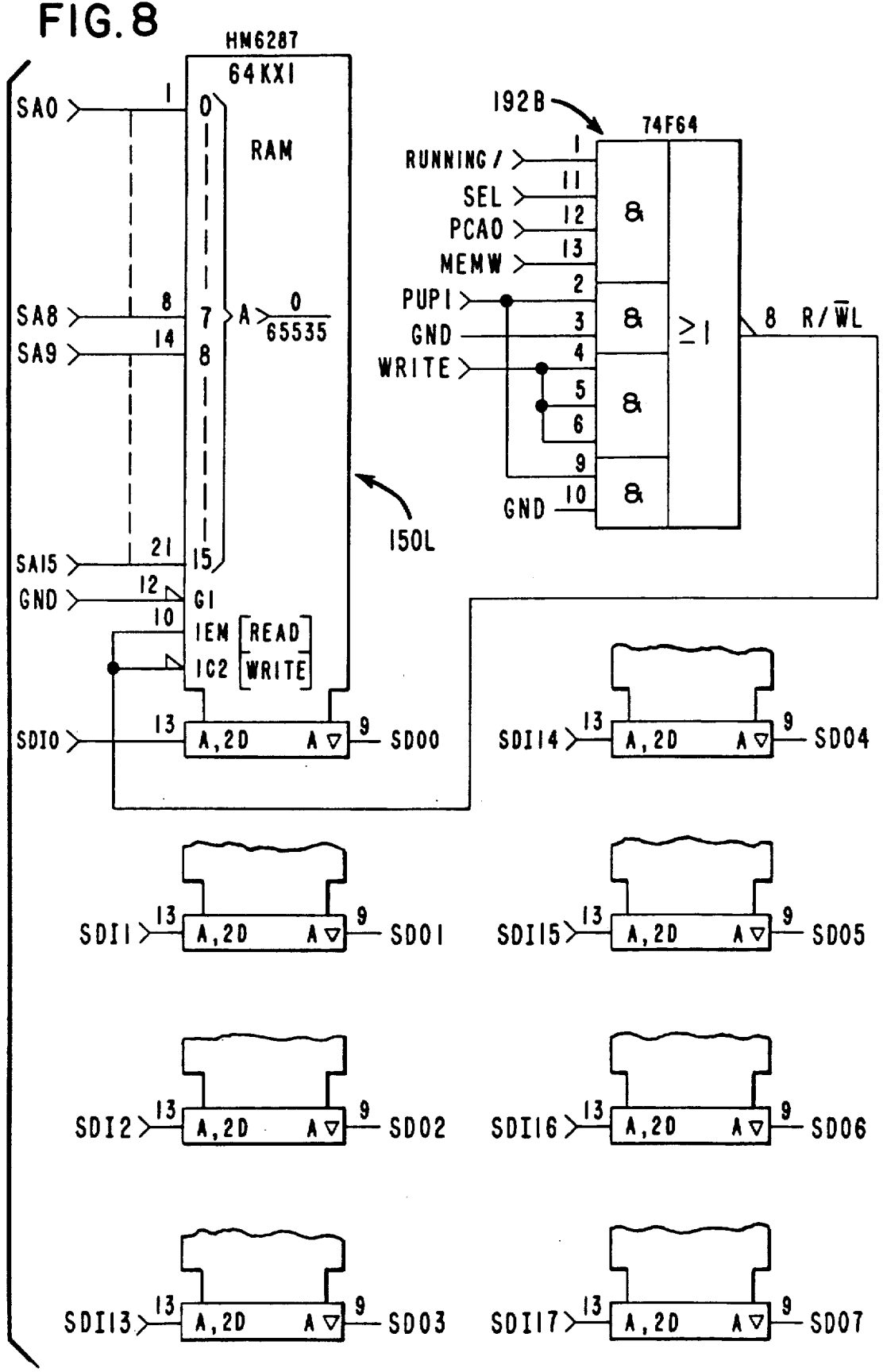
FIG. 8 illustrates in integrated circuit diagram form the low portion of the RAM of FIG. 4.

In FIG. 8, there is shown the 74F64 chip which forms the low logic circuit 192B and the associated low memory RAMs 150L which form the remaining ½ of the RAM memory 150. In a like manner, as to the FIG. 7 description above, the RAM chips are all identical and the only variance is in the connections to the control portions.

Figures 9, 9A:
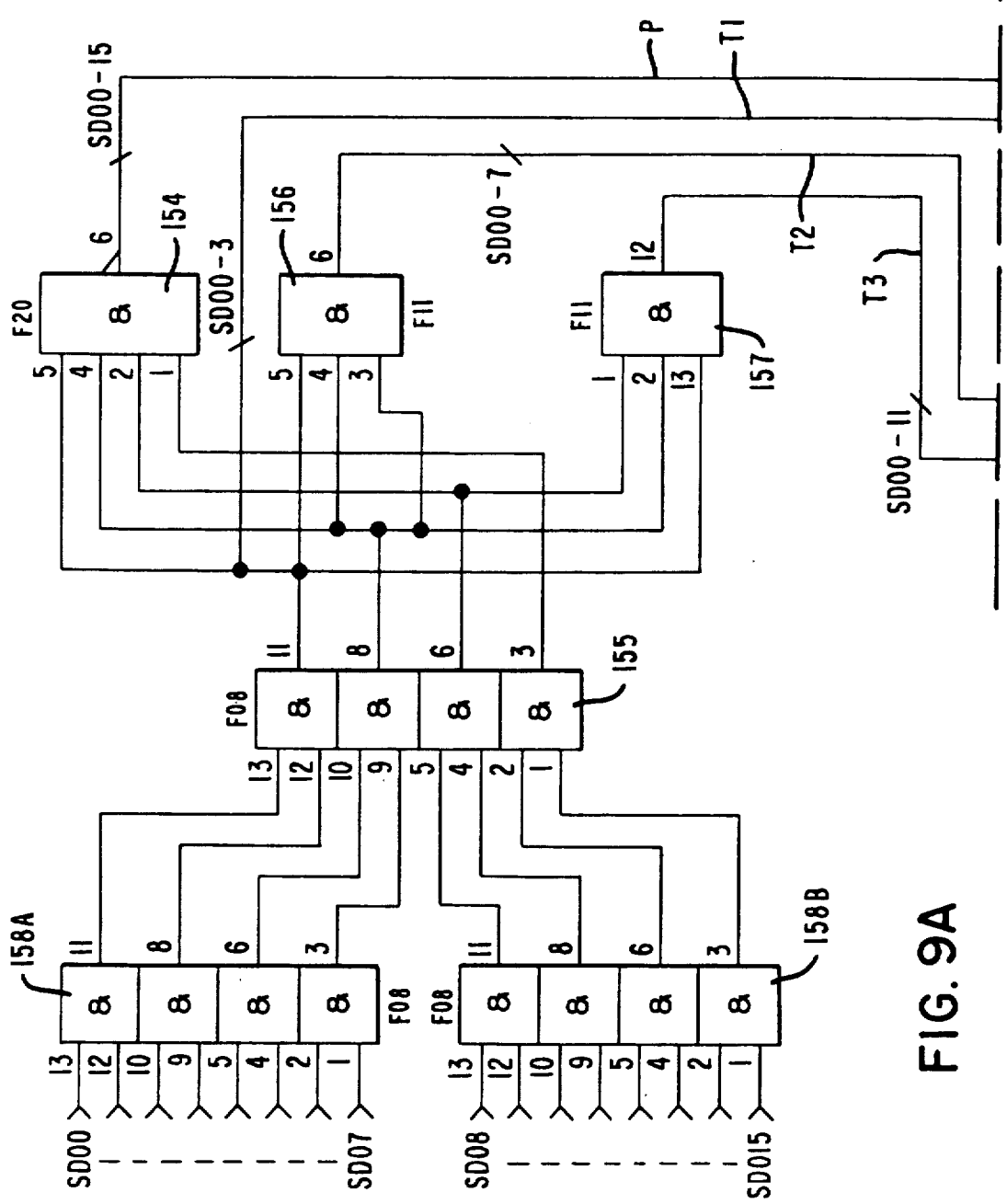
FIG. 9 is a map illustrating the assembly orientation of FIGS. 9A, 9B and 9C.
FIGS. 9A, 9B and 9C illustrate in integrated circuit diagram form the address counters and look-ahead logic of FIG. 4.
Figure 9B:
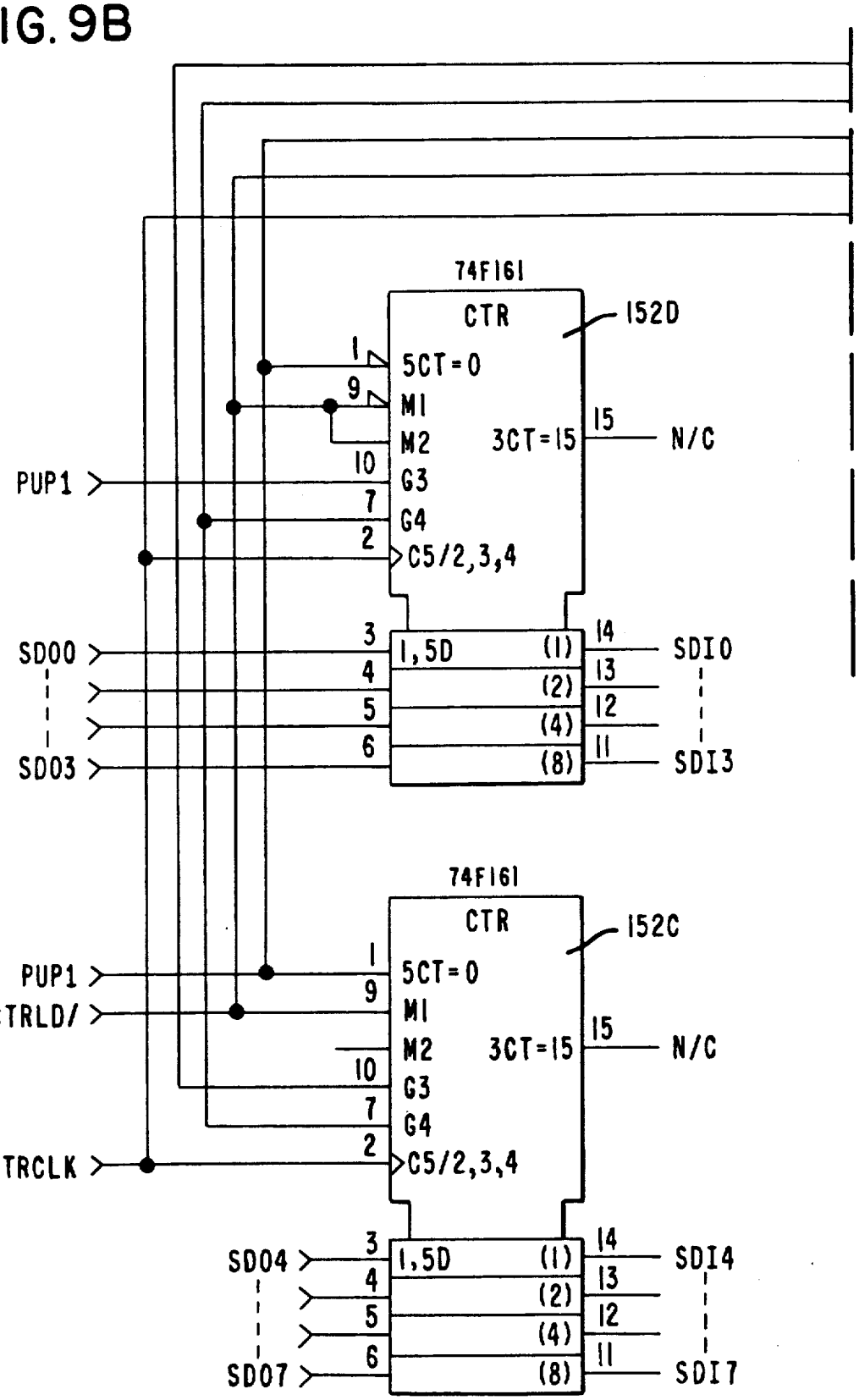
Figure 9C:
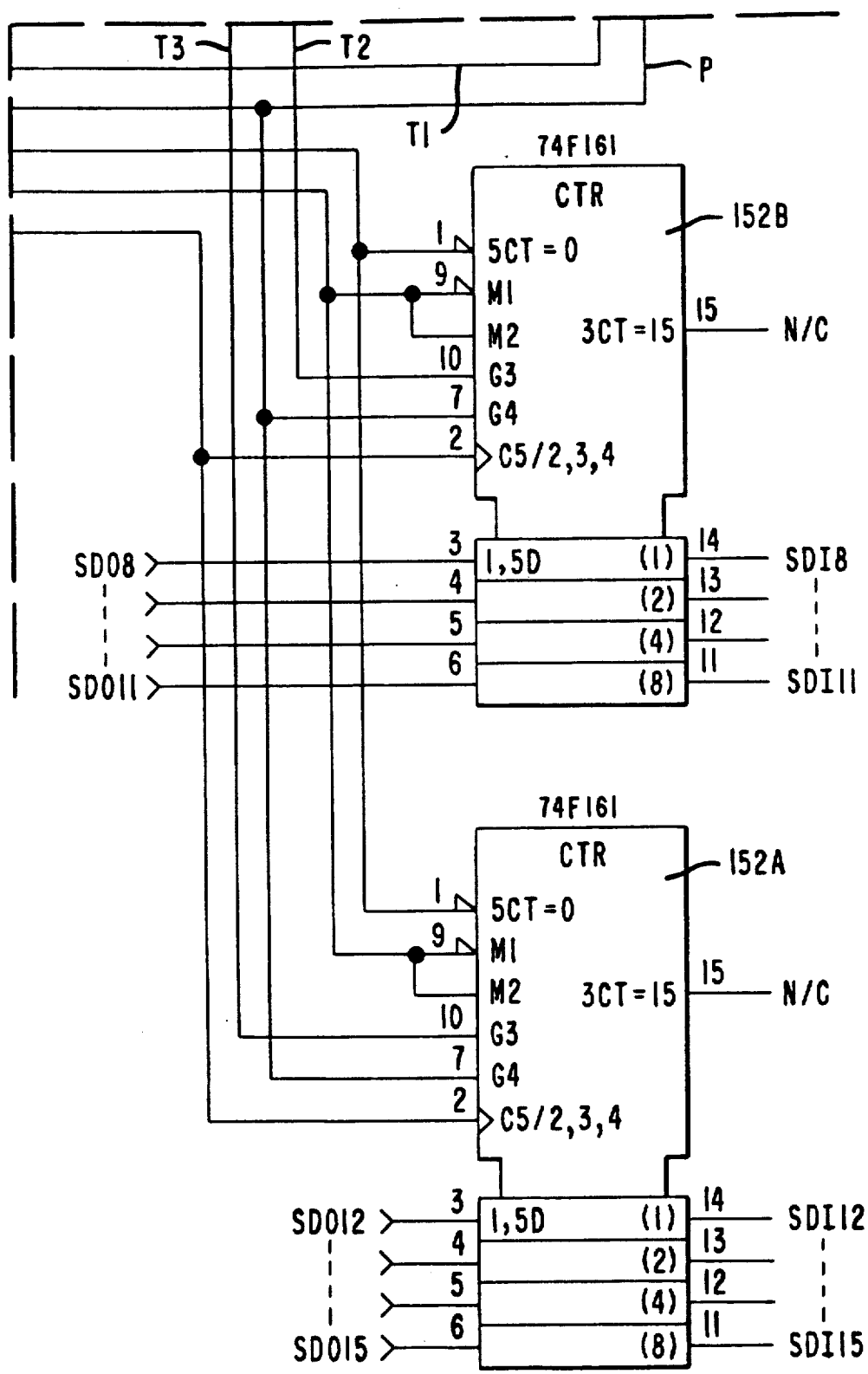

Referring now to FIGS. 9A, 9B, and 9C assembled in accordance with the map of FIG. 9, the counter 18 is comprised of four 74F161 integrated circuit chips 152A-D, of the type manufactured by Fairchild, Inc. Each chip is a 4-bit counter. To form the complete counter the chips are cascaded. Each counter chip receives four of the SDO bits on the inputs numbered 3-6 and provides four bits of the total count on its outputs numbered 11-14. A fast look-ahead carry circuit for the counter 18 is shown comprised of a group of 74F08 AND gates 158A, 158B and 155, 74F11 AND gate 156 and 157, and a 74F20 NAND gate 154. The purpose of the look-ahead carry circuit is to quickly determine whether or not each 4-bit counter stage should increment. At each counter a signal on an enable T line activates that counter if all the bits in the preceding counter stages are 1s. The enable P signal disables all counter stages if the total count is all 1s. The AND gates 158A and 158B combine in pairs the memory data output bits SDO0-7 and SD08-15, respectively. The AND gate 155 combines in pairs the four outputs from each of the gates 158A and 158B. The NAND gate 154 provides an active signal to the counter P inputs when all of the bits SDO0-15 are of a 1 level so as to inhibit the counter from incrementing. The gate 155 provides an active signal to the counters $T_1$ input when the bits SDO0-3 are 1 so as to enable the second counter stage. In a like manner, the gate 156 provides an active signal to the counters $T_2$ input when the bits SDO0-7 are 1 so as to enable the third counter stage. The active signal generated by the gate 157 when the bits SDO0-11 are 1 is applied to the $T_3$ input to activate the fourth counter stage. The main purpose of this arrangement is to perform a quick setting of the counter to match the data bits read from the memory. It is an effective, quick, parallel loading of the counters that permits the count to be quickly advanced by one and restored back in memory if the count is not all 1s. The incremented count appears at the counter outputs as the bits labeled SDI0-SDI15.

Figure 10:
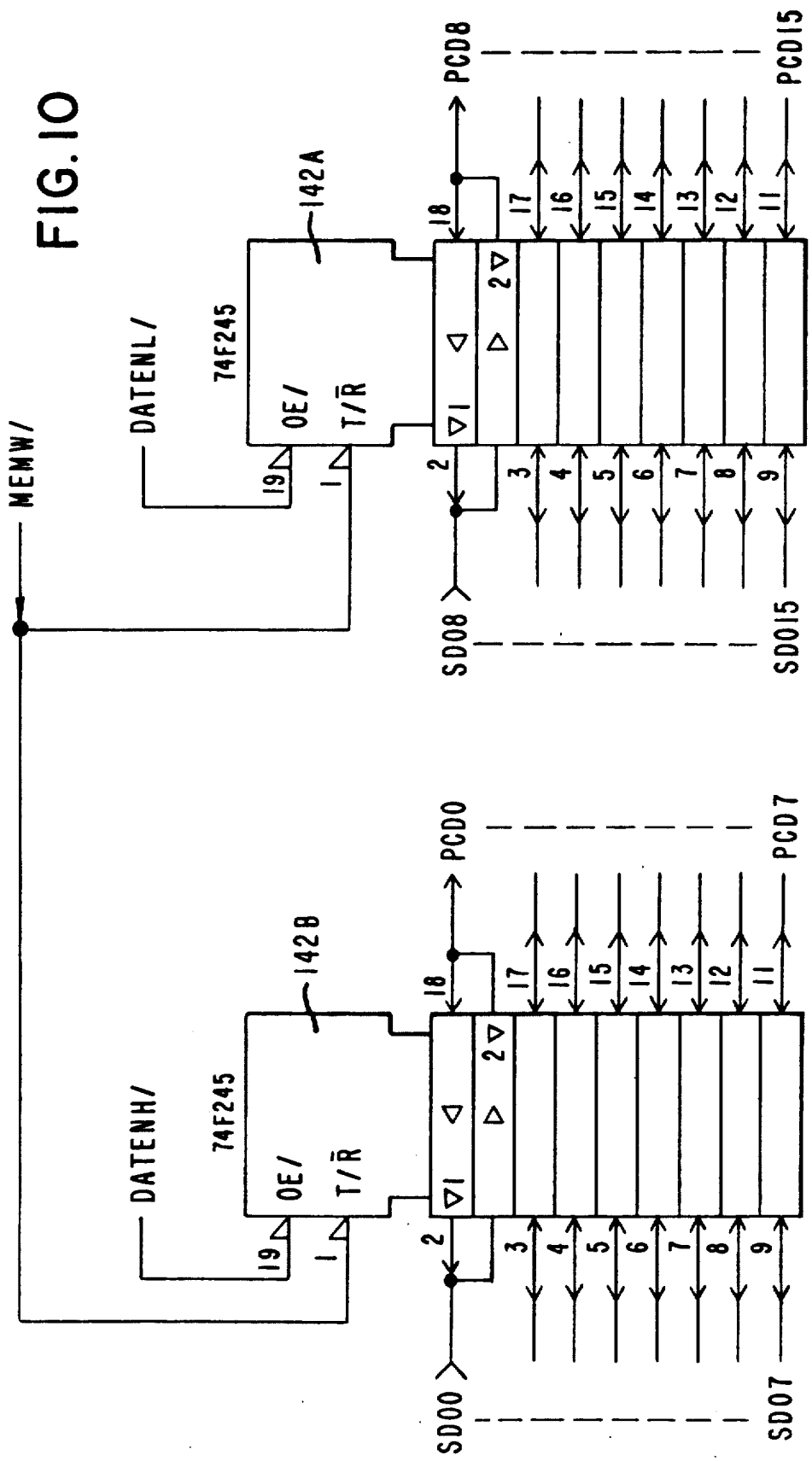
FIGS. 10A and 10B illustrate in integrated circuit diagram form the board select, monitor data buffer and monitor data buffer enable circuitry, of FIG. 4.

Referring to FIG. 10, the buffers 142A and 142B are 74F245 integrated circuit chips which permit the transfer of data through the chips in a direction that is determined by the state of the signal on the T/R inputs. A high signal on the output enable inputs OE/ disables the transfer of data by placing the chips in a high impedance state.

Figure 11:
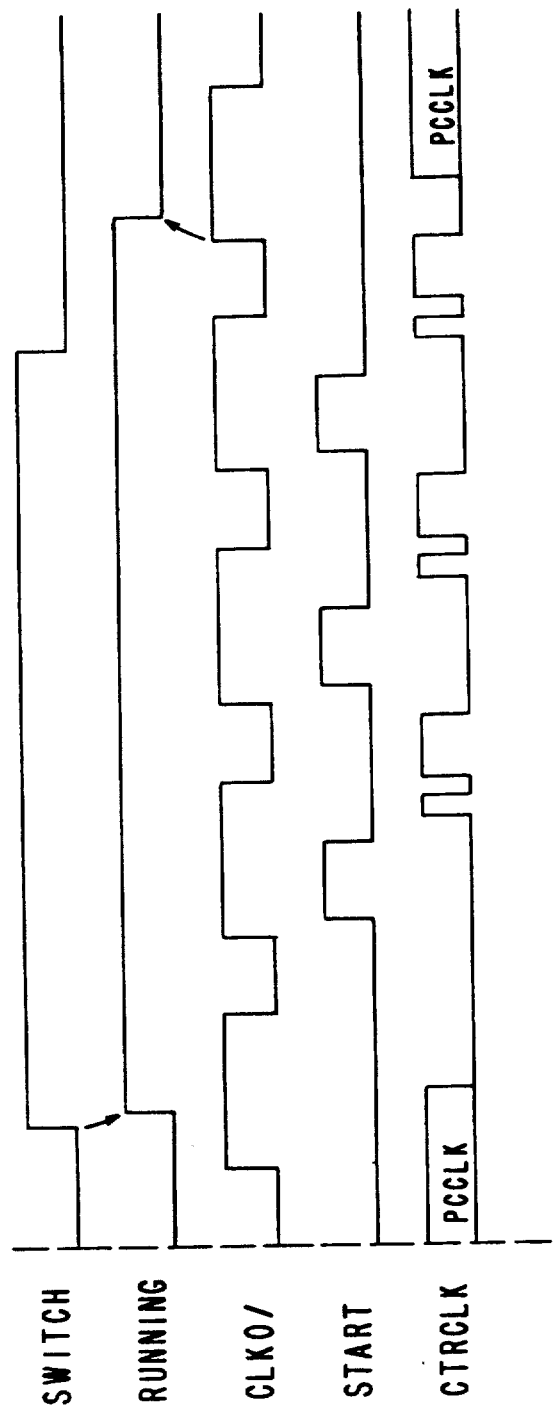
FIG. 11 is a timing diagram useful for an understanding of the operation of the preferred embodiment of the invention.

Referring to the waveforms of FIG. 11, the signal SWITCH goes high at the output of inverter 42 by placing the switch 43 in the upper position. The SWITCH signal causes the signal RUNNING, at the Q output of flip-flop 191B to go high. The SWITCH signal also causes the START signal to go high at the Q output of the flip-flop 191A after the occurrence of a CLK01 transition. The START signal passes through the delay circuits 194A and 194B and the multiplexer 200 to provide the CTRCLK signal To place the system in the non-running mode the switch 43 is moved to its lower position and the SWITCH signal goes low. The RUNNING signal will then go low on the next low to high transition of the clock signal CLK01.

Figure 12:
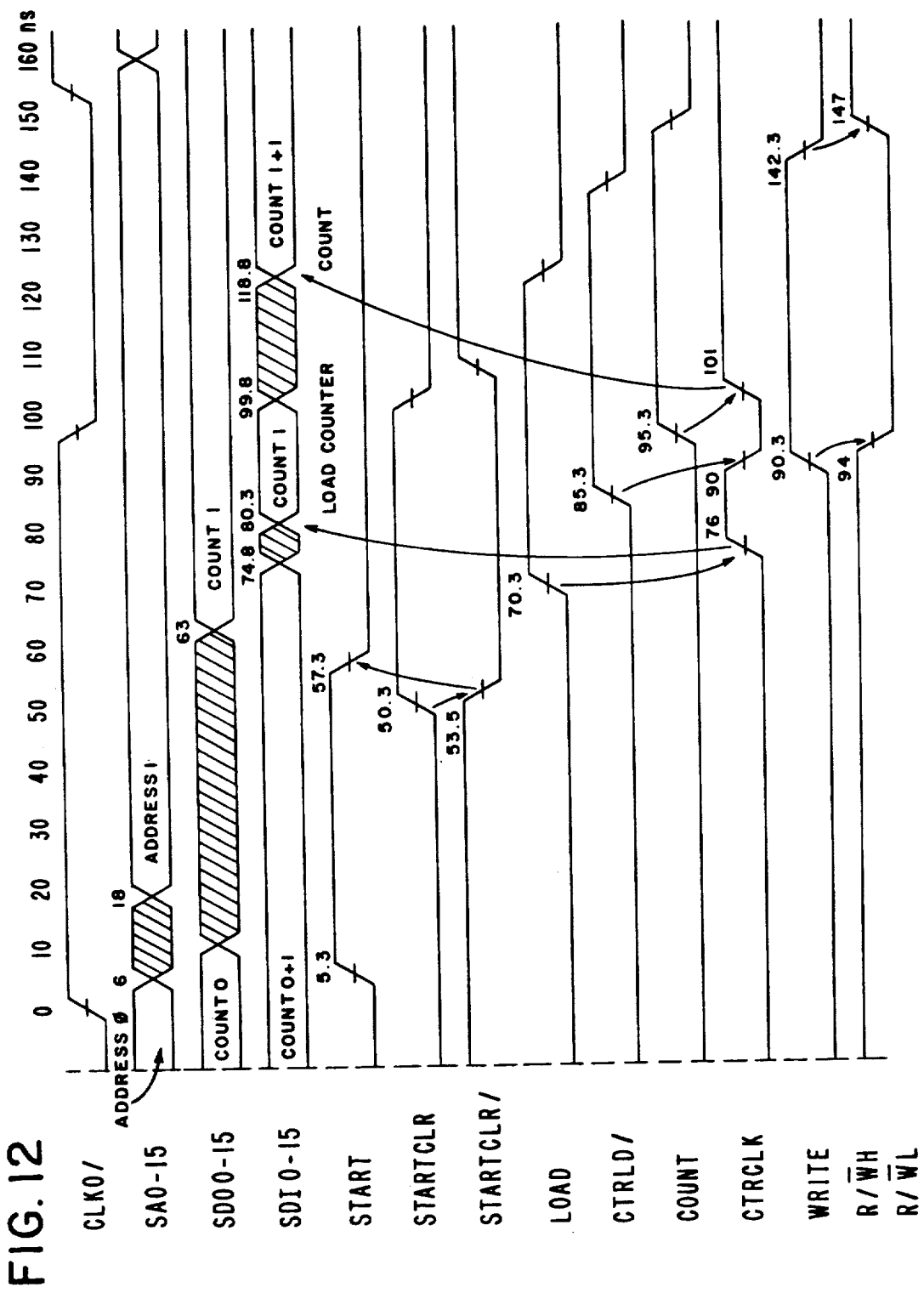
FIG. 12 is a timing diagram useful for an understanding of the operation of the preferred embodiment of the invention.

Referring to the waveforms of FIG. 12, address bits SA0-15 appear at the A inputs to the RAM 16. The STARTCLR signal goes high causing the complement signal STARTCLR/ to go low which in turn causes the START signal to go low. The LOAD signal goes high causing the CTRCLK signal to go high and the counter is loaded with the count bits SDI0-15 addressed by the bits SDO0-15. The CTRLD/ signal goes high causing CTRCLK to go low. The COUNT signal goes high causing the counter to increment the count by 1. At approximately the same time the WRITE signal goes high and causes the signals R/W/H and the R/W/L to become active loading the incremented count into the RAM 16.

Figure 13:
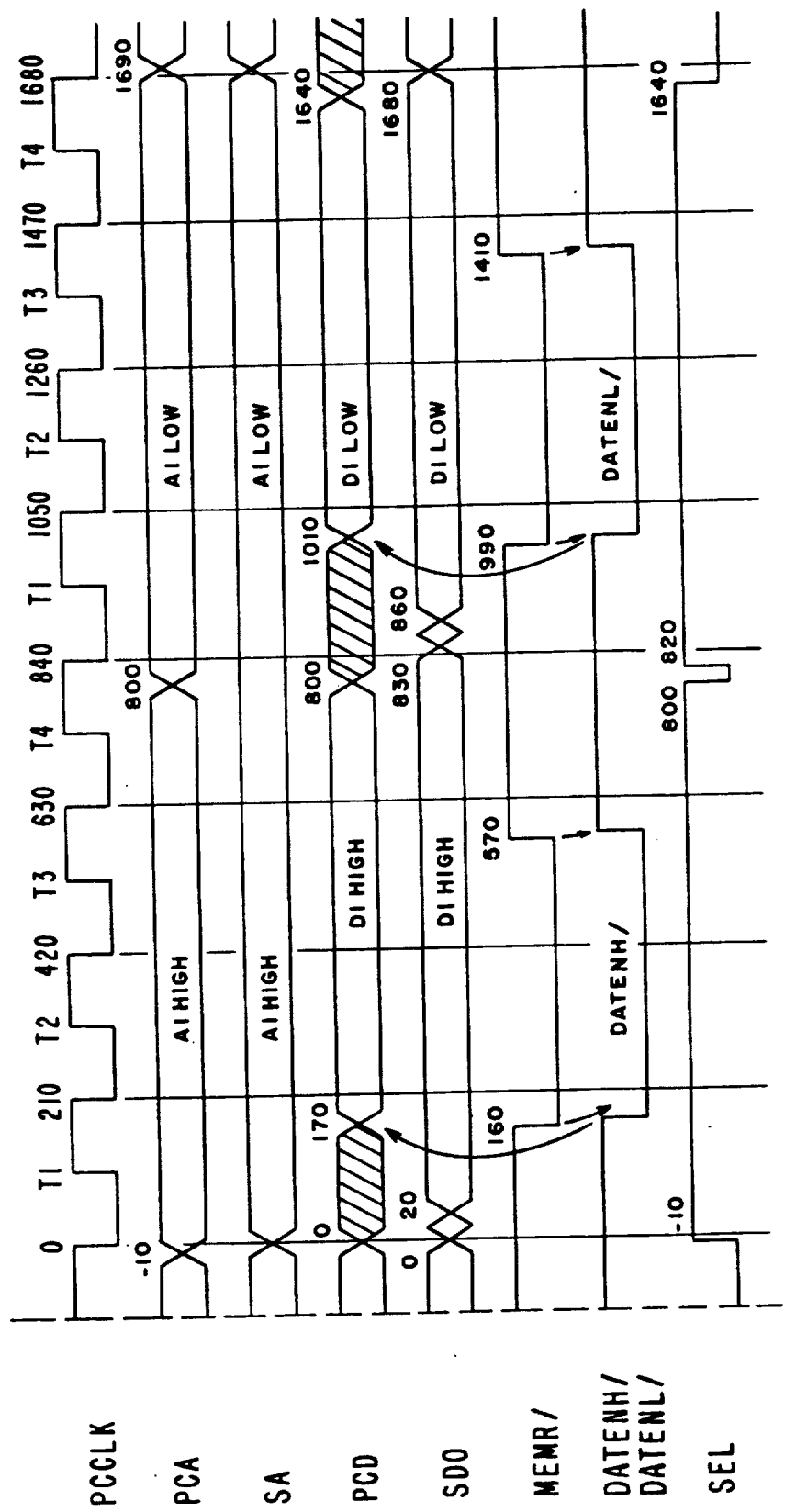
FIG. 13 is a timing diagram useful for an understanding of the operation of the preferred embodiment of the invention.

Referring to FIG. 13, the operation shown by the waveforms is that of reading data from the RAM and of transferring the data to the monitor computer in two blocks of eight data bits each via the buffers 142A and 142B. For example, when the DATEN H/ signal is active the high data bits are transmitted to the monitor computer. When the DATEN L/ signal is active the low data bits are transmitted to the monitor computer.

Figure 14:
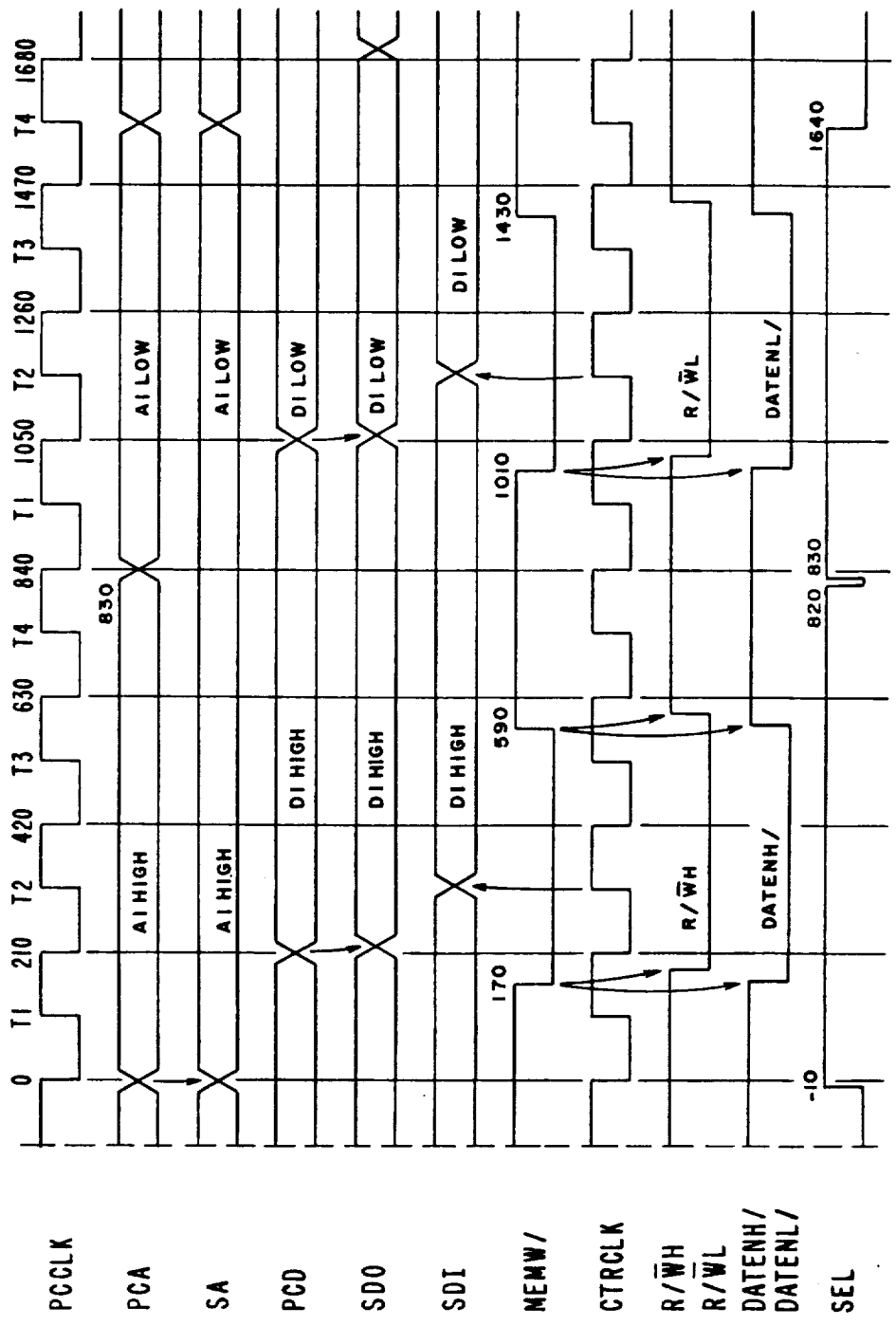
FIG. 14 is another timing diagram useful for an understanding of the operation of the preferred embodiment of the invention.

Referring to the waveforms of FIG. 14, the operation shown is that of writing data from the monitor computer to the RAM in two blocks of eight data bits each via the buffers 142A and 142B. When the DATEN H/ signal is active the high data bits are transmitted to the RAM. When the DATEN L/ signal is active the low data bits are transmitted to the RAM.

While there has been shown what is considered to be the preferred embodiment of the invention, it will be manifest that many changes and modifications can be made therein without departing from the spirit and the scope of the invention, the scope of the invention being limited only by the scope of the appended claims.

We claim:

1. A computer address analyzer for determining the thoroughness of a computer testing procedure comprising:
   a probe means coupled to an address bus of a computer under test for receiving and holding the address signals appearing on the address bus;
   an addressable memory means having a memory location for each valid address respectively that will appear on the address bus of the computer under test connected to said probe means, each memory location accessibly storing signals indicative of a count;
   a counter mans coupled to said addressable memory means for receiving the count stored in a memory location each time said memory location is addressed by the computer under test and for incrementing said count by one and for returning the incremented count back to the same memory location; and
   a means coupled to said addressable memory means, for reading out of said addressable memory means the count stored in each memory location for determining the magnitude of the count corresponding to the address signals received by each memory location respectively.

2. The computer address analyzer according to claim 1 and further comprising:
   a monitor computer means coupled to said means for reading out for analyzing the completeness of the computer testing procedure by determining the number of being addresses being accessed and of the number of times each address is accessed.

3. The address analyzer according to claim 2 and further comprising:
   a control means coupled to said counter means and said monitor computer means, for controlling the flow of addresses to said addressable memory means from the computer under test and the flow of accessed counts from said addressable memory to sand from said counter means and to said monitor computer means.

4. The computer address analyzer according to claim 3 and further comprising:
   a first interfacing means interposed between said probe means and said addressable memory means for gating address signals in response to said control means; and
   a second interfacing means interposed between said monitor computer means and said addressable memory means for gating the accessed counts to said monitor computer means in response to said control means.

5. The computer address analyzer according to claim 1 wherein said counter means includes a means for setting said counter means to said count prior to incrementing said count by one.

6. The computer address analyzer according to claim 3 and further comprising means for coupling a clock signal from the computer under test to said control means for synchronizing the operation of said computer address analyzer with the operation of the computer under test.

7. A computer address analyzer for monitoring the number of times an address in a computer under test appears on an address bus comprising:
   a probe comprised of a plurality of flip-flop circuits;
   a bus cable coupled to one end to the address bus of the computer under test and at the other end connected to said probe, so that said flip-flops receive and hold the address signals received from the bus cable;
   a memory means having at least one addressable memory location for every valid address appearing on the address bus of the computer under test;
   a monitor computer for analyzing a count stored in each memory location respectively;
   an interfacing means for interfacing the probe and the monitor computer to said memory means;
   a control means coupled to said memory means, for controlling the operation of said interfacing means and said memory means such that each address appearing on the address bus of the computer under test is used to access a location in said memory means; and
   a counter means coupled to said memory means, for counting the number of times an address is accessed and for providing each count to said memory means for storing.

8. The computer address analyzer according to claim 7 wherein said counter means includes a look-ahead means for setting said counter means to a count fetched from said memory means prior to incrementing the counter by one.

9. The computer address analyzer according to claim 8 and further comprising:
   a means for coupling a clock signal from the computer under test to said control means for synchronizing the operation of said computer address analyzer with the operation of the computer under test.

10. A computer address analyzer comprising:
    a memory means having at least one addressable location for every valid address appearing on an address bus of a device under test;
    a first coupling means for coupling the address signals appearing on the address bus of the device under test to said memory means to cause said memory means to fetch a count stored in the location accessed by said address, said count representing the number of times the memory location has been addressed;
    a counter coupled to said memory means, whereby said counter receives the count fetched by said memory means, increments said count by one and restores the incremented count back to said memory means for storing in the location accessed;
    a means for analyzing the counts stored in said memory means;
    a second coupling means for coupling the counts from said means to said means for analyzing; and
    a control means coupled to said first and said second coupling means, said memory means and said counter for controlling the flow of addresses, counts and incremented counts.

11. A computer address analyzer according to claim 10 further comprising:
    a look-ahead means coupled between said memory means and said counter for setting said counter to the count fetched from said memory means.

12. The computer address analyzer according to claim 10 and further comprising:
    a means for coupling a clock signal from the computer under test to said control means for synchronizing the operation of said computer address analyzer with the operation of the device under test.

* * * * *

UNITED STATES PATENT AND TRADEMARK OFFICE
CERTIFICATE OF CORRECTION

PATENT NO. : 5,051,944
DATED : September 24, 1991
INVENTOR(S) : David T. Fetterolf, et al.

It is certified that error appears in the above-identified patent and that said Letters Patent is hereby corrected as shown below:

Column 9, line 16, "mans" should be --means--.

Column 9, line 34, delete "being", both occurrences.

Column 9, line 44, delete "sand" and substitute --and--.

Column 10, line 1, "to", first occurrence, should be --at--.

Signed and Sealed this

Ninth Day of March, 1993

Attest:

STEPHEN G. KUNIN

Attesting Officer

Acting Commissioner of Patents and Trademarks